(12) United States Patent
Luo et al.

(10) Patent No.: US 10,725,343 B2
(45) Date of Patent: Jul. 28, 2020

(54) DISPLAY PANEL AND DISPLAY DEVICE

(71) Applicants: HKC Corporation Limited, Baoan Dist, Shenzhen (CN); Chongqing HKC Optoelectronics Technology Co., Ltd., Chongqing (CN)

(72) Inventors: Xu-Gang Luo, Chongqing (CN); Qiong Wu, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 15/744,847

(22) PCT Filed: May 12, 2017

(86) PCT No.: PCT/CN2017/084122
§ 371 (c)(1),
(2) Date: Jan. 15, 2018

(87) PCT Pub. No.: WO2018/120582
PCT Pub. Date: Jul. 5, 2018

(65) Prior Publication Data
US 2020/0081280 A1    Mar. 12, 2020

(30) Foreign Application Priority Data

Dec. 29, 2016 (CN) .......................... 2016 1 1248007

(51) Int. Cl.
*G02F 1/1339* (2006.01)
*G02F 1/1335* (2006.01)

(52) U.S. Cl.
CPC ...... *G02F 1/1339* (2013.01); *G02F 1/133512* (2013.01); *G02F 1/133514* (2013.01); *G02F 1/133528* (2013.01)

(58) Field of Classification Search
None
See application file for complete search history.

(56) References Cited

U.S. PATENT DOCUMENTS

| | | | |
|---|---|---|---|
| 10,483,486 B2* | 11/2019 | Zhang | H01L 51/5246 |
| 2010/0214521 A1* | 8/2010 | Togashi | G02F 1/1339 |
| | | | 349/153 |
| 2013/0236680 A1* | 9/2013 | Ahn | G02F 1/133308 |
| | | | 428/68 |
| 2013/0271714 A1* | 10/2013 | Hirota | G02F 1/1339 |
| | | | 349/139 |
| 2014/0204293 A1* | 7/2014 | Kim | G02F 1/133351 |
| | | | 349/15 |

* cited by examiner

*Primary Examiner* — Ali Naraghi
(74) *Attorney, Agent, or Firm* — Wang Law Firm, Inc.

(57) ABSTRACT

A display panel and a display device are provided. Wherein, the display panel includes a first substrate, a second substrate disposed opposite to the first substrate, and a sealing layer disposed on two ends of the display panel to seal the first substrate and the second substrate. The sealing layer includes a light-shading layer and a sealing-glue layer.

11 Claims, 5 Drawing Sheets

DISPLAY PANEL AND DISPLAY DEVICE

CROSS-REFERENCE TO RELATED APPLICATION

This application claims the benefit of China Patent Application No. 201611248007.0, filed on Dec. 29, 2016, in the State Intellectual Property Office of the People's Republic of China, the disclosure of which is incorporated herein in its entirety by reference.

BACKGROUND OF THE INVENTION

1. Field of the Invention

The present application relates to the display panel technology, and especially relates to a display panel and a display device.

2. Description of the Related Art

As the technology continuously improved, liquid-crystal displays become mainstream products being broadly used in various kinds of applications because the aroused general interest in their thinner physical body, higher energy efficiency, and lower radiation emission. Most of liquid-crystal displays are backlit type including a liquid-crystal panel and a backlight module. The working mechanism of a liquid-crystal panel is the orientation control of liquid crystal molecules located between two parallel glass substrates through applying a driving voltage on these substrates, thereby refracting the light generated by the backlight module to form images.

Among liquid-crystal displays, a thin film transistor-liquid crystal display (TFT-LCD) is becoming prominent in display industry because of its lower power consumption, high image quality, and better production yield. Similarly, the TFT-LCD also includes a liquid-crystal panel and a backlight module, wherein the liquid-crystal panel contains a color filter substrate or a CF substrate, a thin film transistor substrate (TFT Substrate), and a mask. There are a transparent electrode and a layer of liquid crystal molecules (LC molecules) located between these substrates.

For the purpose of improving the viewing sensation of reality of a thin film transistor-liquid display (TFT-LCD), borderlessness is devised. Following the remove of the border, the edge light leakage becomes an issue and has to be dealt with. Otherwise, it will appear a phenomenon of periphery light leakage. Regarding the edge light leakage issue, a black tape was once adhesively applied to prevent the leakage by someone, but after a period of use, detachment issue starts surfacing and causes a lot of problems.

It should be noted that the above description of the background art is merely provided for clear and complete explanation of the techniques of the present application and for facilitating the understanding by those skilled in the art. It should not be understood that the above technical solution is known to those skilled in the art as it is described in the background art.

SUMMARY OF THE INVENTION

Because of the aforementioned shortcomings of the current technology, the technical issue the present application intents to resolve is to provide a high yield display panel and display device.

For that purpose, the present application provides a display panel, including:
a first substrate;
a second substrate disposed opposite to the first substrate;
a sealing layer disposed on two ends of the display panel to seal the first substrate and the second substrate;
wherein the sealing layer includes:
a light-shading layer and a sealing glue layer.

Moreover, light-blocking ink is used for the light-shading layer. The light-blocking ink may be black light-blocking ink, which meets the purpose of preventing the light leakage by blocking as well as absorbing the light; this approach does not require high standard of physical property of the light-blocking ink material, not only which does not need to have sufficient adhesiveness but requires only around 90% of light blocking rate.

Moreover, the sealing glue layer includes hot-melt glue. The hot-melt glue is polyurethane reactive glue (PUR glue), the curing and crosslinking process of which is a reaction with moisture found in the air to form a stable chemical structure. PUR hot-melt glue has good weatherability. Fue to irreversible crosslinking property, it is not becoming creepy and brittle following temperature changes. It has good tenacity, high adhesiveness at beginning, excellent permeability and affinity, and 40% to 60% higher adhesive strength than other adhesives under the same conditions, thereby reducing the usage of it. These prevent the falling away issue and secure the yield of products of the present application.

Moreover, the sealing glue layer includes light-curing glue. The light-curing glue is ultraviolet-ray-curing glue (UV glue), which is a type of adhesive that can only be cured under ultraviolet ray. The curing mechanism is that the photoinitiator (or photosensitizer) in the UV-curing material absorbs ultraviolet ray to generate active radicals or cations, which trigger monomer polymerization and a crosslinking chemical reaction to transform the liquid into a solid state in a few seconds, thereby greatly improving working efficiency. After curing, the material is complete transparent and the product does not turn yellow or become whitened in a long period of use. Comparing to the traditional instant adhesive bonding, the material has advantages of good performance in environmental tests, not turning white, good flexibility, etc. The adhesiveness or durability is far better than the black tape sealing material or the like, which prevents the falling away problem and greatly improves the yield of products.

Moreover, the first substrate includes an array substrate. The second substrate includes a color-filter substrate. The display panel further includes a front polarizer disposed on the outer side of the array substrate and a rear polarizer disposed on the outer side of the color-filter substrate. The sealing layer includes a light-shading layer at the inner side, a sealing-glue layer in the middle, and a protecting-glue layer that performs sealing on the edges of the front polarizer and the rear polarizer on the outer side of the sealing-glue layer. In this case, the sealing layer includes the protecting-glue layer as its periphery part that improves the abilities of dust-proof, water-proof, anti-electromagnetic wave, impact resistance, etc., the sources of which may contaminate or damage the substrates. In addition, the protecting-glue layer performs the sealing on the edges of the front polarizer and the rear polarizer, thereby additionally providing the impact-resistant protection to the front polarizer and the rear polarizer, avoiding the polarizer's bending up issue, and therefore improving production yield. Also, the three layers structure of the light-shading layer, the sealing-glue layer, and the protecting-glue layer has better outcome in light-shading, sealing, and buffering effects than a single layer of composite glue. Furthermore, apart from production yield improvement, the technical requirement of the material of each single layer is also lowered Moreover, the first substrate includes an array substrate. The second substrate includes a color-filter substrate. The display panel further includes a front polarizer disposed on the outer side of the array substrate and a rear polarizer disposed on the outer side of the color-filter substrate. The sealing layer includes a sealing-glue layer being at the inner side, a light-shading layer in the middle, and a protecting-glue layer that performs sealing on the edges of the front polarizer and the rear polarizer on the outer side of the light-shading layer. In this case, the sealing layer includes the protecting-glue layer as its periphery part that improves the abilities of dust-proof, water-proof, anti-electromagnetic wave, impact resistance, etc., the sources of which may contaminate or damage the substrates; in addition, the protecting-glue layer performs the sealing on the edges of the front polarizer and the rear polarizer, thereby additionally providing the impact-resistant protection to the front polarizer and the rear polarizer, avoiding the polarizer's bending up issue, and therefore improving production yield. Also, the three layers structure of the light-shading layer, the sealing-glue layer, and the protecting-glue layer has better outcome in light-shading, sealing, and buffering effects than a single layer of composite glue. Furthermore, apart from production yield improvement, the technical requirement for the material of each single layer is also lowered.

Furthermore, the protecting-glue layer includes an electromagnetic-wave-protecting-glue layer, an aqueous-vapour-protecting-glue layer, or an electromagnetic-wave-and-aqueous-vapour-protecting-glue layer. In this case, based on the product positioning and requests, one can choose the electromagnetic-wave-protecting-glue layer, aqueous-vapour-protecting-glue layer, or the electromagnetic-wave-and-aqueous-vapour-protecting-glue layer for aqueous vapour protection or electromagnetic wave protection, thereby improving the quality of the products.

Moreover, light-blocking ink is used for the light-shading layer. The sealing-glue layer includes hot-melt glue or light-curing glue. The first substrate includes an array substrate and the second substrate includes a color-filter substrate. The display panel further includes a front polarizer disposed on the outer side of the array substrate and a rear polarizer disposed on the outer side of the color-filter substrate. The sealing layer includes the light-shading layer at the inner side, the sealing-glue layer in the middle, and a protecting-glue layer that performs sealing on the edges of the front polarizer and the rear polarizer on the outer side of the sealing-glue layer. The protecting-glue layer includes an electromagnetic-wave-protecting glue, an aqueous-vapour-protecting glue, or an electromagnetic-wave-and-aqueous-vapour-protecting glue. The three-layer structure of the light-shading layer, the sealing-glue layer, and the protecting-glue layer has better outcome in light-shading, sealing, and buffering effects than a single layer of composite glue. Furthermore, apart from production yield improvement, the technical requirement for the material of each single layer is also lowered.

Furthermore, black-frame glue or black tape is used for the light-shading layer, and hot-melt glue or curing glue is used for the sealing-glue layer. The first substrate includes an array substrate and the second substrate includes a color-filter substrate. The display panel further includes a front polarizer disposed on the outer side of the array substrate and a rear polarizer disposed on the outer side of the color-filter substrate. The sealing layer further includes a protecting-glue layer that performs sealing on the edges of the front polarizer and the rear polarizer on the outer side of the sealing-glue layer. The protecting-glue layer includes an electromagnetic-wave-protecting glue, an aqueous-vapour-protecting glue, or an electromagnetic-wave-and-aqueous-vapour-protecting glue. In this case, the black tape or the black-frame glue is retained such that the relative equipment remains in use without a waste. The sealing-glue layer and the protecting-glue layer are disposed at the outer side of the black tape or the black-frame glue may improve the light-shading property, adhesiveness, durability, impact resistance, aqueous vapour protection, and anti-electromagnetic-wave ability. The requirement of the physical properties of the black tape or the black-frame glue is comparatively lowered, which means the aforementioned unqualified black tape or black-frame glue can be partly used without a waste of them, thereby improving the production yield.

A display device includes any one of the display panels disclosed in the present application.

The borderless display panel, such as a borderless liquid-crystal panel, includes two main parts: substrates and a backlight module. Wherein, the substrates mainly includes an array substrate and a color-filter substrate, and a sealing layer seals the array substrate and the color-filter substrate from the edges. A black tape is currently often used as the sealing layer, which however tends to lose its adhesiveness after a long period of use and the resulting falling away will lead to light leakage and low production yield problems. In the present application, the light-shading layer and the sealing-glue layer are both used for their own distinctive purposes, which make them dedicate only to their own purposes and need not to compensate between light-shading and sealing properties like the black tape has to, thereby providing better light-shading and sealing effect without falling apart and leakage issues and thereby improving the production yield.

Accompanying with figures, specific embodiments of the present application will be described hereinafter. These embodiments illustrate some applicable ways of the present application. The present application is, however, not limited by these embodiments. Rather, the present application is to cover all modifications, equivalents, and alternatives falling within the spirit and scope of the appended claims.

The technical description or/and features in one embodiment can be also identically or comparably used in other embodiments. For example, they can be used in combination with the features in other embodiments or to replace features in other embodiments.

It should be noted that the term "include/including" or "include/including" means the named elements are essential but is inclusive or open-ended and does not exclude additional, unrecited elements or method steps.

BRIEF DESCRIPTION OF THE DRAWINGS

The accompanying drawings, which are incorporated in and constitute a part of this specification, illustrate several embodiments of the present application and together with the description, serve to explain the principles of the present application. It is obvious that the drawings in the following description are only related to some embodiments of the present application. Those ordinarily skilled in the art may obtain other embodiments according to these drawings, without any inventive work. In the drawings.

DESCRIPTION OF THE PREFERRED EMBODIMENTS

To enable those skilled in the art to better understand the technical solutions of the present application, the embodiments of the present application are described below with reference to the accompanying drawings, and, apparently, the described example embodiments merely represent a part of and not all of the embodiments of the present application. Based on the embodiments of the present application, all other embodiments derived by persons of ordinary skill in the art, without using creative efforts, shall fall within the protection scope of the present application.

For the purpose of improving the viewing sensation of reality of a thin film transistor-liquid display (TFT-LCD), borderlessness is therefore devised. Following the remove of the border, the edge light leakage becomes an issue and has to be dealt with. Otherwise, it will appear a phenomenon of periphery light leakage. Regarding the edge light leakage issue, a black tape can be adhesively applied to prevent the leakage, but after a period of use, a detachment issue starts surfacing and causes lots of problems.

Figure 1:
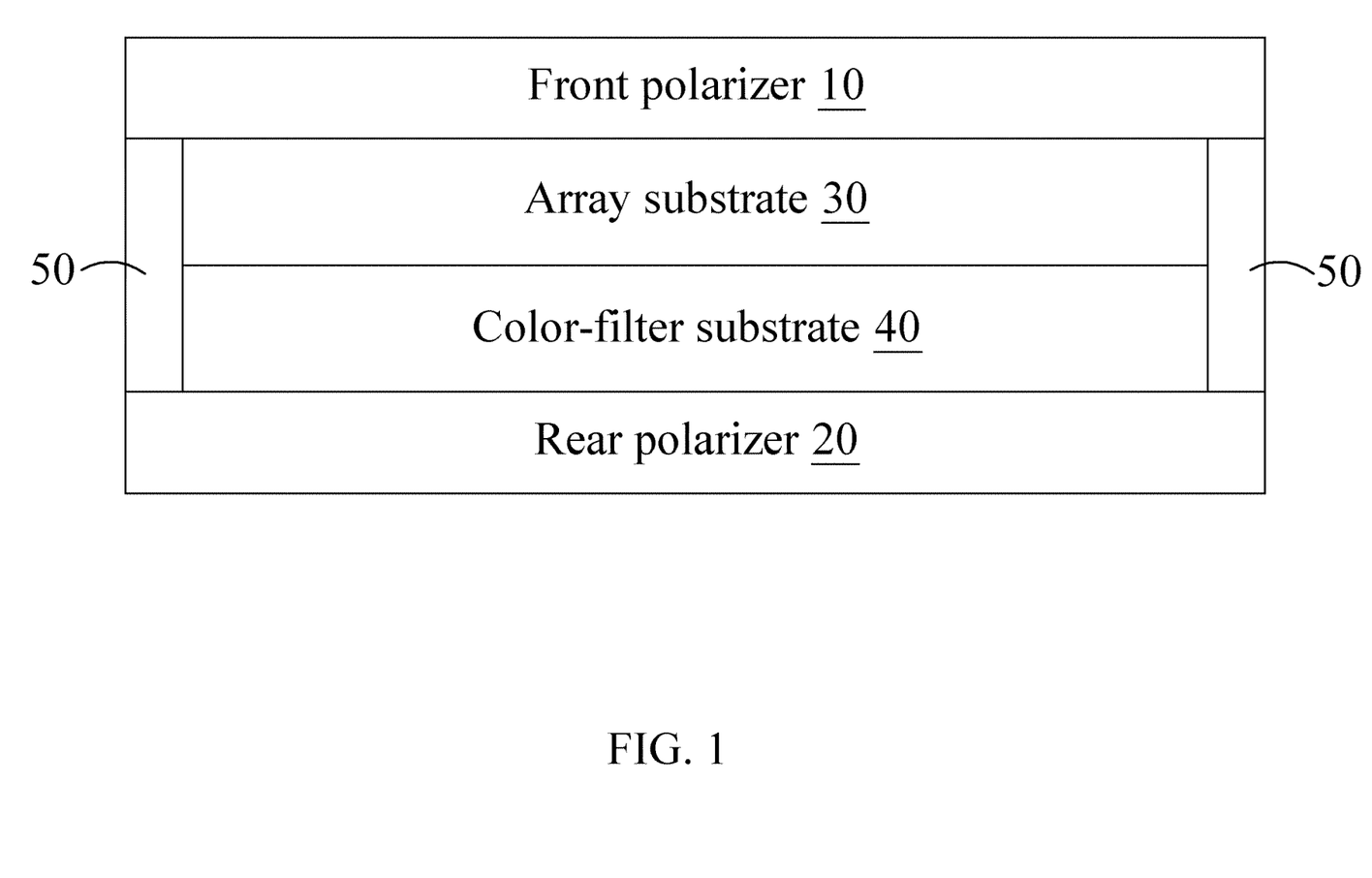
FIG. 1 is a schematic diagram showing a display panel using a black sealant structure as a sealing layer.

FIG. 1 is the schematic diagram showing a display panel using a black-sealant frame as a sealing layer. As shown in FIG. 1, in order to solve the detachment problem, a configuration of using a black-frame glue 50 to replace the black tape is used, that is, the black-frame glue 50 is applied on two ends of each one of the array substrate 30 and the color-filter substrate 40, thereby absorbing the light and avoiding the leakage. This approach greatly achieves the light-shading effect as the black tape has and reduces the happening of the detachment after a long period of use.

This approach, however, requires more raw materials and higher manufacturing technique piling up the cost; in addition, there are more requirements on the black-frame glue such as light-shading property, sufficient adhesiveness, water-proof ability, and even impact resistance.

Figure 2:
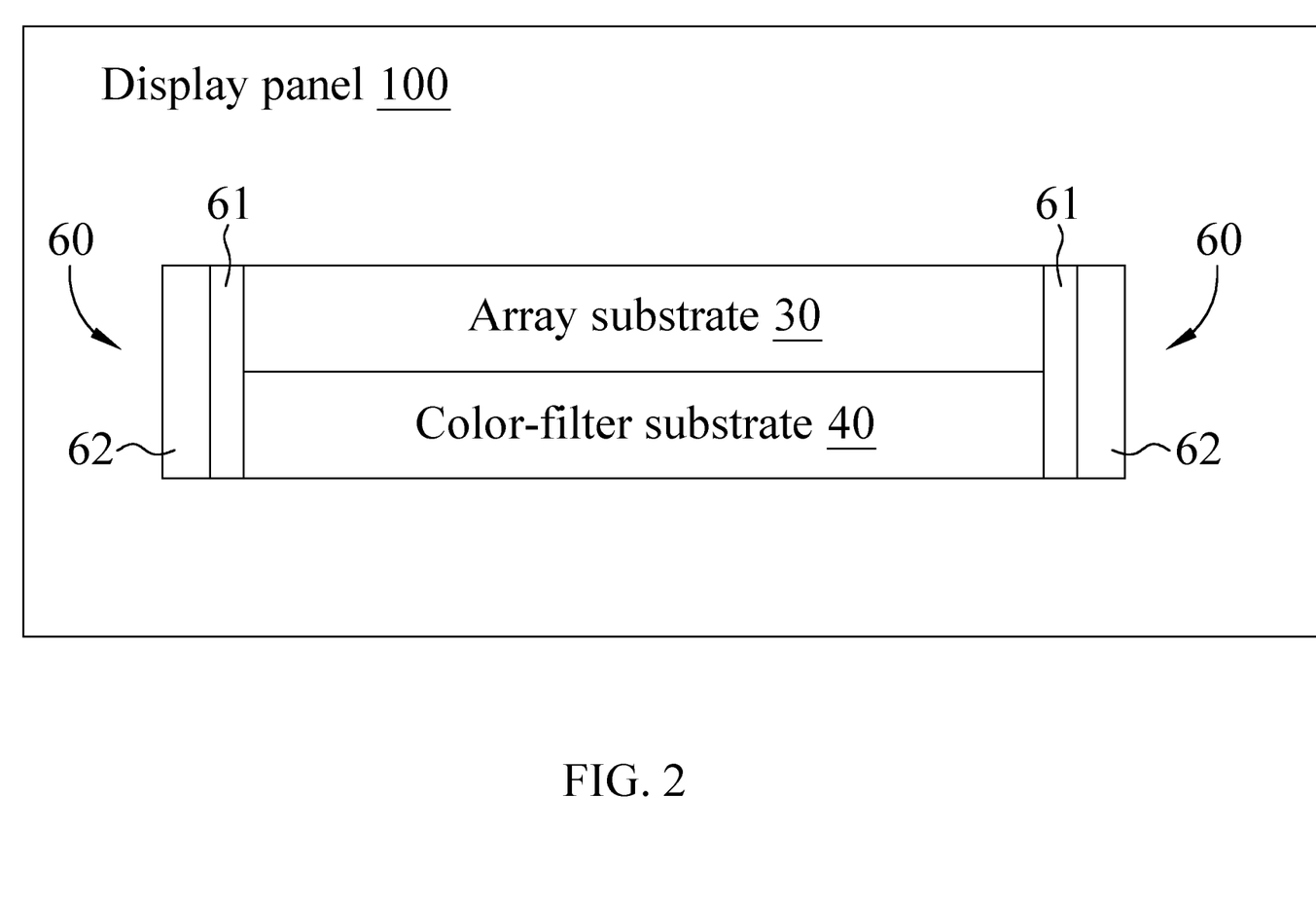
FIG. 2 is a schematic diagram showing a display panel of the present application.

FIG. 2 is the schematic diagram showing a display panel of the present application. In the embodiment shown in FIG. 1, the display panel 100 includes:

a first substrate (array substrate 30 for instance);

a second substrate (color-filter substrate 40 for instance) disposed opposite to the first substrate;

a sealing layer 60 disposed on two ends of the display panel 100 to seal the first substrate and the second substrate;

the sealing layer 60 includes:

a light-shading layer 61 and a sealing-glue layer 62.

Wherein, the light-shading layer 61 and the sealing-glue layer 62 in the figure can exchange their positions.

In some embodiment, TFT array and the color filter can be formed on a single substrate.

In some embodiment, the display panel 100 can be, for instance, a liquid-crystal display panel, an OLED-display panel, a curved-display panel, or any other type of display panel.

The borderless display panel, such as a borderless liquid-crystal panel, includes two main parts: substrates and a backlight module. Wherein, the substrates mainly includes an array substrate and a color-filter substrate, and a sealing layer seals the array substrate and the color-filter substrate at the edges. In some embodiments, a black tape can be used as the sealing layer, which however tends to lose its adhesiveness after a long period of use and the resulting falling away will lead to light leakage and low production yield problems. In other embodiments of the present application, the light-shading layer and the sealing-glue layer are both used for their own distinctive purposes, which make them dedicate only to their own purposes and need not to compensate between the light-shading and the sealing properties like the black tape has to, thereby providing better light-shading and sealing effect without falling apart and leakage issues and thereby improving the production yield.

In this optional embodiment, light-blocking ink is used as the light-shading layer 61. The light-blocking ink may be black light-blocking ink, which meets the purpose of preventing the light leakage by blocking as well as absorbing the light. This approach does not require high standard of physical property of the light-blocking ink material, not only which does not need to have sufficient adhesiveness but requires only around 90% of light blocking rate.

In this optional embodiment, the sealing-glue layer 62 includes hot-melt glue. The hot-melt glue is polyurethane reactive glue (PUR glue), the curing and crosslinking process of which is a reaction with moisture found in the air to form a stable chemical structure; PUR hot-melt glue has good weatherability. Due to irreversible crosslinking property, it is not becoming creepy and brittle following temperature changes. It has good tenacity, high adhesiveness at beginning, excellent permeability and affinity, and 40% to 60% higher adhesive strength than other adhesives under the same conditions, thereby reducing the usage of it. These prevent the falling away issue and secure the yield of products of the present application.

In this optional embodiment. the sealing-glue layer 62 includes light-curing glue. The light-curing glue is ultraviolet-ray-curing glue (UV glue), which is a type of adhesive that can only be cured under ultraviolet ray, and the curing mechanism is that the photoinitiator (or photosensitizer) in the UV-curing material absorbs ultraviolet ray to generate active radicals or cations, which trigger monomer polymerization and a crosslinking chemical reaction to transform the liquid into a solid state in a few seconds, thereby greatly improving working efficiency. After curing, the material is completely transparent and the product does not turn yellow or become whitened in a long period of use. Comparing to the traditional instant adhesive bonding, the material has advantages of good performance in environmental tests, not turning white, good flexibility, etc. The adhesiveness or durability is far better than the black tape sealing material or the like, which prevents the falling away problem and greatly improves the yield of products.

Figure 3:
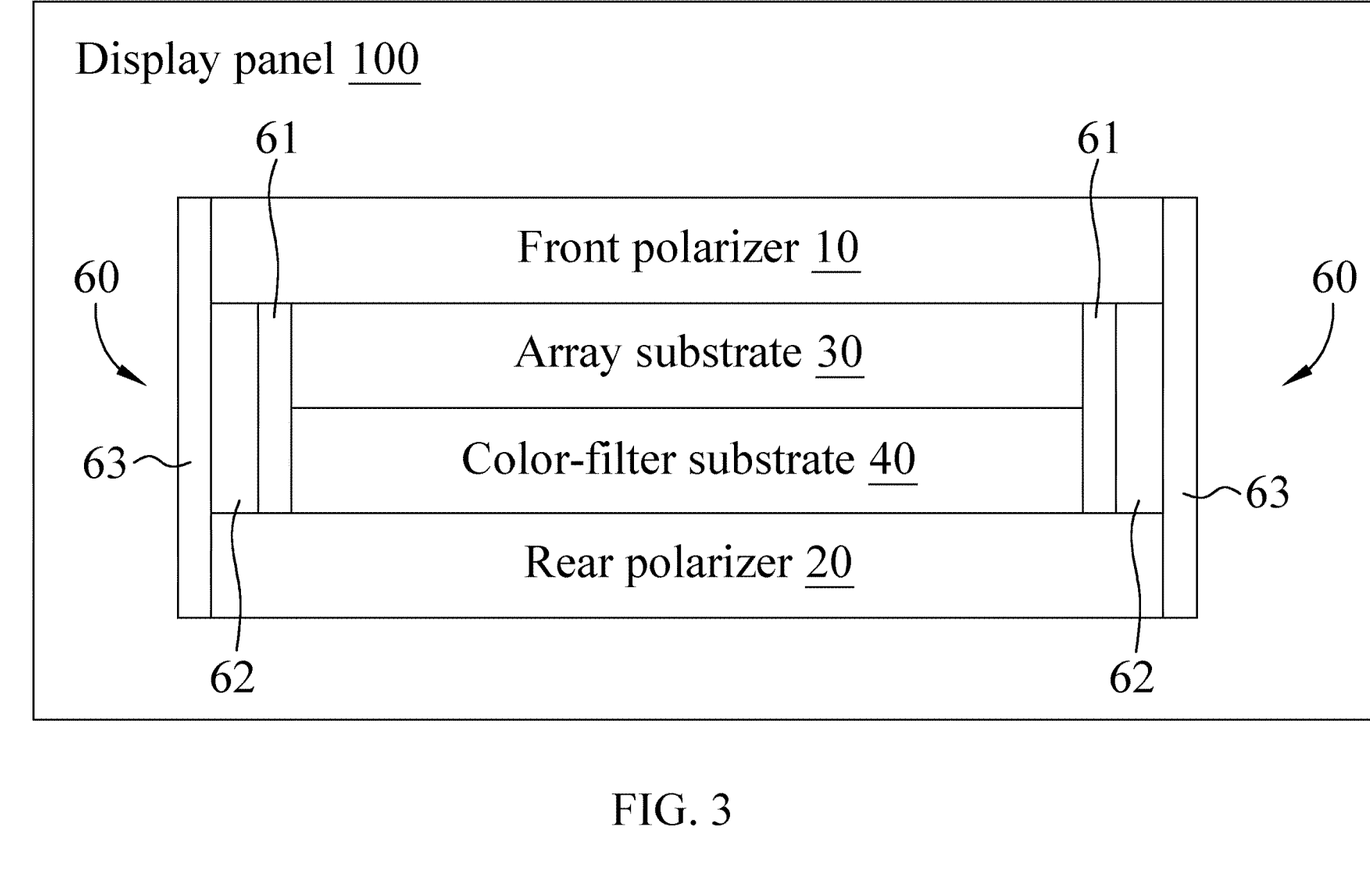
FIG. 3 is a second schematic diagram showing a display panel of the present application.
Figure 4:
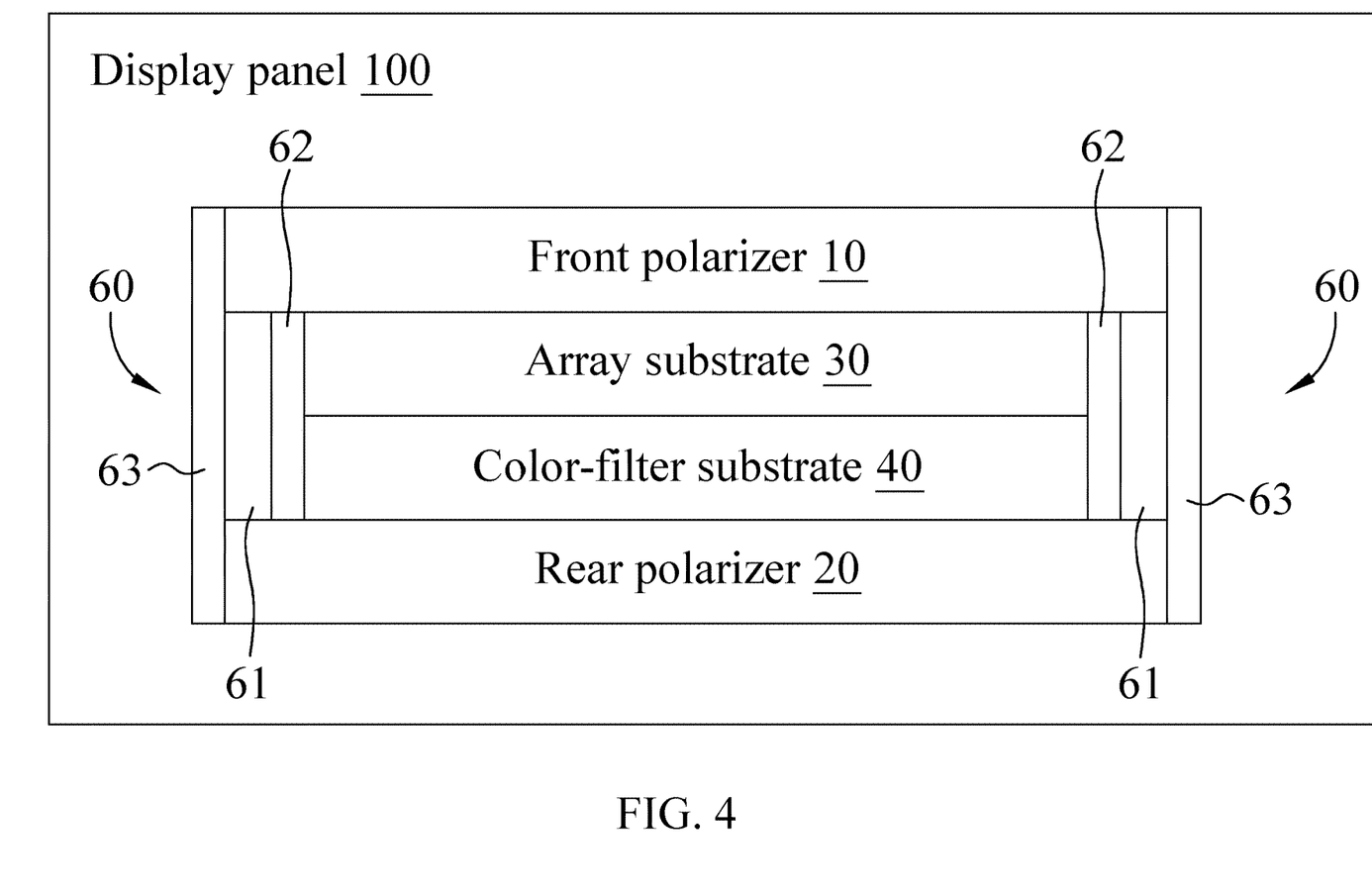
FIG. 4 is a third schematic diagram showing a display panel of the present application.

FIG. 3 is the second schematic diagram showing a display panel of the present application. As an optional embodiment shown in FIG. 3, the first substrate is an array substrate 30 for instance and the second substrate is a color-filter substrate 40 for instance. The display panel 100 further includes a front polarizer 10 disposed on the outer side of the array substrate 30, and a rear polarizer 20 disposed on the outer side of the color-filter substrate 40. The sealing layer 60 includes a light-shading layer 61 at the inner side, a sealing-glue layer 62 in the middle, and a protecting-glue layer 63 that performs sealing on the edges of the front polarizer 10 and the rear polarizer 20 on the outer side of the sealing-glue layer 62. In this case, the sealing layer includes the protecting-glue layer as its periphery part that improves the abilities of dust-proof, water-proof, anti-electromagnetic wave, impact resistance, etc., the sources of which may contaminate or damage the substrates; in addition, the protecting-glue layer performs the sealing on the edges of the front polarizer and the rear polarizer, thereby additionally providing the impact-resistant protection to the front polarizer and the rear polarizer, avoiding the polarizer's bending up issue, and therefore improving production yield. Also, the three layers structure of the light-shading layer, the sealing-glue layer, and the protecting-glue layer has better outcome in light-shading, sealing, and buffering effects than a single layer of composite glue. Furthermore, apart from production yield improvement, the technical requirement of the material of each single layer is also lowered FIG. 4 is the third schematic diagram showing a display panel of the present application. As an optional embodiment shown in FIG. 4, the first substrate is an array substrate 30 for instance, and the second substrate is a color-filter substrate 40 for instance. The display panel 100 further includes a front polarizer 10 disposed on the outer side of the array substrate 30, and a rear polarizer 20 disposed on the outer side of the color-filter substrate 40. The sealing layer 60 includes a sealing-glue layer 62 at the inner side, a light-shading layer 61 in the middle, and a protecting-glue layer 63 that performs sealing on the edges of the front polarizer 10 and the rear polarizer 20 on the outer side of the light-shading layer 61. In this case, the sealing layer includes the protecting-glue layer as its periphery part that improves the abilities of dust-proof, water-proof, anti-electromagnetic wave, impact resistance, etc., the sources of which may contaminate or damage the substrates; in addition, the protecting-glue layer performs the sealing on the edges of the front polarizer and the rear polarizer, thereby additionally providing the impact-resistant protection to the front polarizer and the rear polarizer, avoiding the polarizer's bending up issue, and therefore improving production yield. Also, the three layers structure of the light-shading layer, the sealing-glue layer, and the protecting-glue layer has better outcome in light-shading, sealing, and buffering effects than a single layer of composite glue. Furthermore, apart from production yield improvement, the technical requirement for the material of each single layer is also lowered.

In this optional embodiment, the protecting-glue layer 63 includes an electromagnetic-wave-protecting-glue layer, an aqueous-vapour-protecting-glue layer, or an electromagnetic-wave-and-aqueous-vapour-protecting-glue layer. In this case, based on the product positioning and requests, one can choose the electromagnetic-wave-protecting-glue layer, aqueous-vapour-protecting-glue layer, or the electromagnetic-wave-and-aqueous-vapour-protecting-glue layer for aqueous vapour protection or electromagnetic wave protection, thereby improving the quality of the products.

In this optional embodiment refers to FIG. 3, light-blocking ink is used for the light-shading layer 61, and the sealing-glue layer 62 includes hot-melt glue or light-curing glue. The first substrate is an array substrate 30 for instance, and the second substrate is a color-filter substrate 40 for instance. The display panel 100 further includes a front polarizer 10 disposed on the outer side of the array substrate 30, and a rear polarizer 20 disposed on the outer side of the color-filter substrate 40. The sealing layer 60 includes a light-shading layer 61 at the inner side, a sealing-glue layer 62 in the middle, and a protecting-glue layer 63 that performs sealing on the edges of the front polarizer 10 and the rear polarizer 20 on the outer side of the sealing-glue layer 62.

The protecting-glue layer 63 includes an electromagnetic-wave-protecting glue, an aqueous-vapour-protecting glue, or an electromagnetic-wave-and-aqueous-vapour-protecting glue. The three-layer structure of the light-shading layer, the sealing-glue layer, and the protecting-glue layer has better outcome in light-shading, sealing, and buffering effects than a single layer of composite glue; furthermore, apart from production yield improvement, the technical requirement for the material of each single layer is also lowered.

In this optional embodiment refers to FIG. 3, a black-frame glue or black tape is used for the light-shading layer 61, and hot-melt glue or curing glue is used for the sealing-glue layer. The first substrate includes an array substrate 30, and the second substrate includes a color-filter substrate 40. The display panel 100 further includes a front polarizer 10 disposed on the outer side of the array substrate 30, and a rear polarizer 20 disposed on the outer side of the color-filter substrate 40. The sealing layer 60 further comprises a protecting-glue layer 63 that performs sealing on the edges of the front polarizer 10 and the rear polarizer 20 on the outer side of the sealing-glue layer 62. The protecting-glue layer 63 includes an electromagnetic-wave-protecting glue, an aqueous-vapour-protecting glue, or an electromagnetic-wave-and-aqueous-vapour-protecting glue. In this case, the black tape or the black-frame glue is retained such that the relative equipment remains in use without a waste. The sealing-glue layer and the protecting-glue layer are disposed at the outer side of the black tape or the black-frame glue may improve the light-shading property, adhesiveness, durability, impact resistance, aqueous vapour protection, and anti-electromagnetic-wave ability. The requirement of the physical properties of the black tape or the black-frame glue is comparatively lowered, which means the aforementioned unqualified black tape or black-frame glue can be partly used without a waste of them, thereby improving the production yield.

Figure 5:
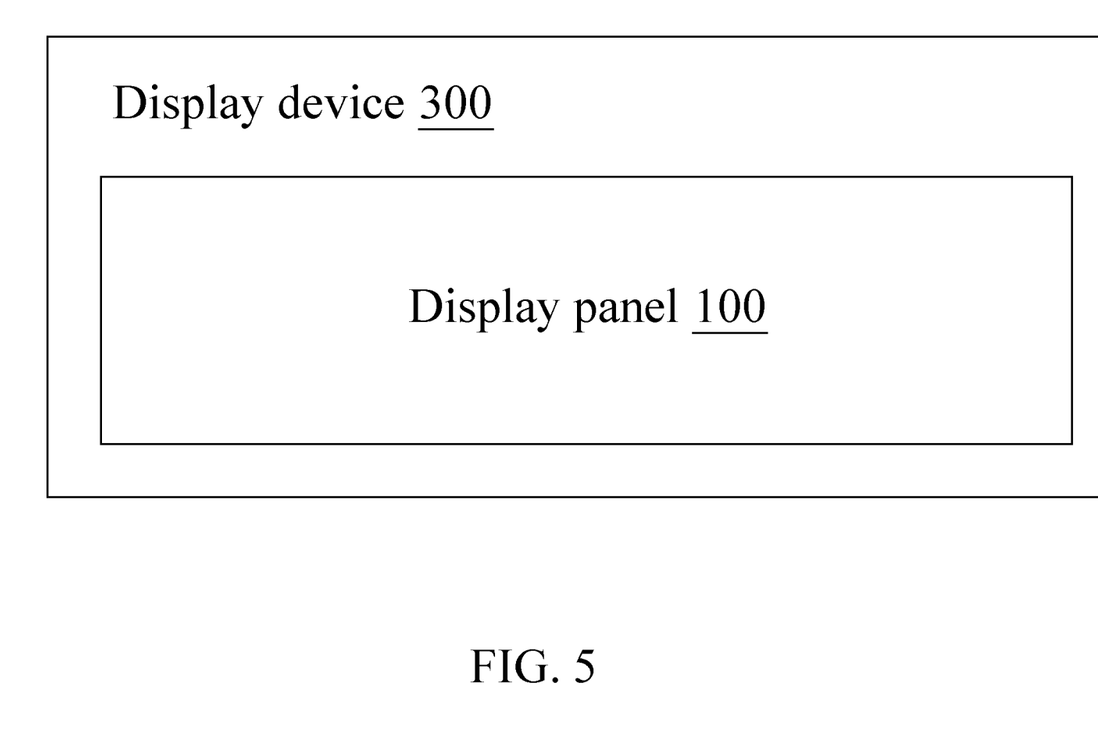
FIG. 5 is a schematic diagram showing a display device of the present application.

FIG. 5 is the schematic diagram showing a display device of the present application, and in the embodiment shown in FIG. 3, the display device 300 includes any one of the display panels 100 disclosed in the present application.

The borderless display panel such as a borderless liquid-crystal panel includes two main parts: substrates and a backlight Wherein, the substrates mainly includes an array substrate and a color-filter substrate, and a sealing layer seals the array substrate and the color-filter substrate from the edges. A black tape is used as the sealing layer, which however tends to lose its adhesiveness after a long period of use and the resulting falling away will lead to light leakage and low production yield problems. In some embodiments of the present application, the light-shading layer and the sealing-glue layer are both used for their own distinctive purposes, which make them dedicate only to their own purposes and need not to compensate between the light-shading and the sealing properties like the black tape has to, thereby providing better light-shading and sealing effects without falling apart and leakage issues and thereby improving the production yield.

Actually, the display panel of the present application specifically includes an array substrate on the first side of the substrate, a color-filter substrate on the second side of the substrate, and a liquid-crystal layer sandwiched between the array substrate and the color-filter substrate. Additionally, there are a thin-film-transistor layer and a first polarizer sequentially disposed between the array substrate and the liquid-crystal layer.

Additionally, there are a color-filter layer and a second polarizer sequentially disposed between the color-filter substrate and the liquid-crystal layer. Moreover, the front polarizer and the rear polarizer are respectively disposed on the outer side the array substrate and the outer side of the color-filter substrate. The sealing layer of the present application is disposed on two ends of the substrates to seal all components between the front polarizer and the rear polarizer. The components other than the sealing layer are not the main inventive objects of the present application and, therefore, only briefed to avoid redundancies.

The description above provides preferable embodiments of the present application. It should be noted that many modifications and variations can be made based on the present application without any creative effort by one skilled in the art. Any technical feature that can be obtained by logical analysis, inference, or limited experimentation on the basis of the present application by one skilled in the art should be within the scope of the appended claims.

What is claimed is:

1. A display panel, comprising:
   a first substrate;
   a second substrate disposed opposite to the first substrate;
   wherein, the first substrate comprises an array substrate and the second substrate comprises a color-filter substrate; and
   a sealing layer disposed on two ends of the display panel to seal the first substrate and the second substrate;
   wherein, the sealing layer comprises a light-shading layer and a sealing glue layer; a light-blocking ink is used for the light-shading layer; and the sealing-glue layer comprises a hot-melt glue or a light-curing glue;
   wherein, the display panel further comprises: a front polarizer disposed on an outer side of the array substrate and a rear polarizer disposed on an outer side of the color-filter substrate; the sealing layer comprises the light shading layer at an inner side, the sealing-glue layer in the middle, and a protecting-glue layer that performs sealing on edges of the front polarizer and the rear polarizer on an outer side of the sealing-glue layer; and the protecting-glue layer comprises an electromagnetic-wave-protecting-glue layer, an aqueous-vapour-protecting-glue layer, or an electromagnetic-wave-and-aqueous-vapour-protecting-glue layer.

2. A display panel, comprising:
   a first substrate;
   a second substrate disposed opposite to the first substrate; and
   a sealing layer disposed on two ends of the display panel to seal the first substrate and the second substrate;
   wherein the sealing layer comprises a light-shading layer and a sealing glue layer.

3. The display panel of claim 2, wherein a light-blocking ink is used for the light-shading layer.

4. The display panel of claim 3, wherein the sealing-glue layer comprises a hot-melt glue or a light-curing glue.

5. The display panel of claim 2, wherein the sealing-glue layer comprises a hot-melt glue or a light-curing glue.

6. The display panel of claim 2, wherein the display panel further comprises: a front polarizer disposed on an outer side of an array substrate, and a rear polarizer disposed on an outer side of a color-filter substrate; and the sealing layer comprises the light-shading layer at an inner side, the sealing-glue layer in the middle, and a protecting-glue layer that performs sealing on edges of the front polarizer and the rear polarizer on an outer side of the sealing-glue layer.

7. The display panel of claim 6, wherein the protecting-glue layer comprises an electromagnetic-wave-protecting-glue layer, an aqueous-vapour-protecting-glue layer, or an electromagnetic-wave-and-aqueous-vapour-protecting-glue layer.

8. The display panel of claim 2, wherein the first substrate comprises an array substrate, and the second substrate comprises a color-filter substrate, and the display panel further comprises a front polarizer disposed on the outer side of the array substrate and a rear polarizer disposed on the outer side of the color-filter substrate, and the sealing layer comprises the sealing-glue layer at an inner side, the light-shading layer in the middle, and a protecting-glue layer that performs sealing on edges of the front polarizer and the rear polarizer on an outer side of the light-shading layer.

9. The display panel of claim 8, wherein the protecting-glue layer comprises an electromagnetic-wave-protecting-glue layer, an aqueous-vapour-protecting-glue layer, or an electromagnetic-wave-and-aqueous-vapour-protecting-glue layer.

10. The display panel of claim 2, wherein a light-blocking ink is used for the light-shading layer, and the sealing-glue layer comprises a hot-melt glue or a light-curing glue, and the first substrate comprises an array substrate, and the second substrate comprises a color-filter substrate, and the display panel further comprises a front polarizer disposed on an outer side of the array substrate and a rear polarizer disposed on an outer side of the color filter substrate, and the sealing layer comprises the light-shading layer at an inner side, the sealing-glue layer in the middle, and a protecting-glue layer that performs sealing on edges of the front polarizer and the rear polarizer on an outer side of the sealing-glue layer, and the protecting-glue layer comprises an electromagnetic-wave-protecting glue, an aqueous-vapour-protecting glue, or an electromagnetic-wave-and-aqueous-vapour-protecting glue.

11. The display panel of claim 2, wherein a black-frame glue or a black tape is used for the light-shading layer, and a hot-melt glue or a curing glue is used for the sealing-glue layer, and the first substrate comprises an array substrate and the second substrate comprises a color-filter substrate, and the display panel further comprises a front polarizer disposed on the outer side of the array substrate and a rear polarizer disposed on the outer side of the color-filter substrate, and the sealing layer further comprises a protecting-glue layer that performs sealing on edges of the front polarizer and the rear polarizer on the outer side of the sealing-glue layer, and the protecting-glue layer comprises an electromagnetic-wave-protecting glue, an aqueous-vapour-protecting glue, or an electromagnetic-wave-and-aqueous-vapour-protecting glue.

* * * * *